United States Patent
Newman et al.

(10) Patent No.: US 10,017,037 B2
(45) Date of Patent: Jul. 10, 2018

(54) VEHICLE HAVING A BATTERY PACK DIRECTLY ATTACHED TO THE CROSS RAILS OF A FRAME STRUCTURE

(71) Applicant: NIO USA, Inc., San Jose, CA (US)

(72) Inventors: Austin L. Newman, San Jose, CA (US); Joshua Smith, Los Gatos, CA (US); Batuhan Yildirim, San Jose, CA (US); Leon Kaunitz, San Jose, CA (US)

(73) Assignee: NIO USA, Inc., San Jose, CA (US)

( * ) Notice: Subject to any disclaimer, the term of this patent is extended or adjusted under 35 U.S.C. 154(b) by 0 days.

(21) Appl. No.: 15/429,095

(22) Filed: Feb. 9, 2017

(65) Prior Publication Data

US 2017/0225558 A1    Aug. 10, 2017

Related U.S. Application Data

(63) Continuation-in-part of application No. 15/224,659, filed on Jul. 31, 2016.

(60) Provisional application No. 62/293,220, filed on Feb. 9, 2016, provisional application No. 62/300,467, filed on Feb. 26, 2016.

(51) Int. Cl.
  *B60K 1/04*     (2006.01)
  *B60L 11/18*    (2006.01)
  *H01M 2/10*     (2006.01)
  *B62D 25/20*    (2006.01)

(52) U.S. Cl.
  CPC ............ *B60K 1/04* (2013.01); *B60L 11/1879* (2013.01); *B62D 25/20* (2013.01); *H01M 2/1077* (2013.01); *H01M 2/1083* (2013.01); *B60K 2001/0438* (2013.01); *H01M 2220/20* (2013.01)

(58) Field of Classification Search
  CPC .. B60L 11/18798; B60L 11/1877; B60K 1/04; B60K 2001/0438; B60K 2001/0455; B60K 2001/0472
  See application file for complete search history.

(56) References Cited

U.S. PATENT DOCUMENTS

| 4,317,497 A | 3/1982 | Alt et al. |
| 5,501,289 A | 3/1996 | Nishikawa et al. |

(Continued)

FOREIGN PATENT DOCUMENTS

DE     202015005208     8/2015

OTHER PUBLICATIONS

U.S. Appl. No. 15/224,659, filed Jul. 31, 2016, Newman.
(Continued)

*Primary Examiner* — Brian L Swenson
(74) *Attorney, Agent, or Firm* — Sheridan Ross P.C.

(57) ABSTRACT

A vehicle has a body forming a passenger compartment. The vehicle also has a chassis supporting the body. The chassis includes a frame structure having a pair of side rails connected by a plurality of rigid cross rails and defining a plurality of bays between the cross rails. The vehicle additionally has a battery pack including a plurality of electrical storage devices stored in a battery housing. The battery housing defines a plurality of channels. The vehicle further includes a fastening mechanism attaching the battery housing directly to the plurality of cross rails with at least a portion of the battery housing in the plurality of bays and the plurality of cross rails in the plurality of channels.

20 Claims, 8 Drawing Sheets

(56) References Cited

U.S. PATENT DOCUMENTS

| | | | |
|---|---|---|---|
| 7,201,384 B2 | 4/2007 | Chaney | |
| 7,507,499 B2 | 3/2009 | Zhou et al. | |
| 7,913,788 B1* | 3/2011 | Bryer | B60K 1/04 180/68.5 |
| 8,051,934 B2 | 11/2011 | Kiya et al. | |
| 8,091,669 B2 | 1/2012 | Taneda et al. | |
| 8,210,301 B2 | 7/2012 | Hashimoto et al. | |
| 8,322,476 B2 | 12/2012 | Komaki | |
| 8,409,749 B2 | 4/2013 | Nishino et al. | |
| 8,839,895 B2 | 9/2014 | Kato et al. | |
| 9,045,030 B2 | 6/2015 | Rawlinson et al. | |
| 9,160,042 B2* | 10/2015 | Fujii | B60K 1/04 |
| 9,321,338 B2 | 4/2016 | Naruke | |
| 9,490,460 B2 | 11/2016 | Yanagi | |
| 9,630,483 B2 | 4/2017 | Yamada et al. | |
| 9,758,030 B2 | 9/2017 | Newman | |
| 2003/0209375 A1 | 11/2003 | Suzuki et al. | |
| 2008/0294283 A1 | 11/2008 | Ligrano | |
| 2009/0058355 A1 | 3/2009 | Meyer | |
| 2009/0078481 A1 | 3/2009 | Harris | |
| 2009/0082957 A1 | 3/2009 | Agassi et al. | |
| 2010/0009244 A1 | 1/2010 | Murata | |
| 2011/0198138 A1 | 8/2011 | Sadrmajles et al. | |
| 2012/0009804 A1 | 1/2012 | Heichal et al. | |
| 2012/0312612 A1 | 12/2012 | Harrison et al. | |
| 2013/0175829 A1 | 7/2013 | Kim et al. | |
| 2013/0270864 A1* | 10/2013 | Young | B60K 1/04 296/187.12 |
| 2014/0284125 A1* | 9/2014 | Katayama | B60K 1/04 180/68.5 |
| 2014/0315064 A1* | 10/2014 | Katayama | B60K 1/04 429/120 |
| 2014/0329125 A1* | 11/2014 | Miyanaga | B60R 13/0861 429/100 |
| 2014/0338999 A1 | 11/2014 | Fujii et al. | |
| 2015/0255764 A1* | 9/2015 | Loo | H01M 2/1083 429/149 |
| 2016/0068195 A1* | 3/2016 | Hentrich | B60K 1/04 180/68.5 |
| 2016/0137229 A1 | 5/2016 | Nishida | |

OTHER PUBLICATIONS

U.S. Appl. No. 15/224,661, filed Jul. 31, 2016, Newman.
U.S. Appl. No. 15/246,856, filed Aug. 25, 2016, Newman et al.
International Search Report and Written Opinion for International Patent Application No. PCT/US17/17137, dated Jun. 6, 2017, 13 pages.
Official Action for U.S. Appl. No. 15/224,659, dated Mar. 21, 2017, 11 pages.
Final Action for U.S. Appl. No. 15/224,659, dated Sep. 11, 2017, 12 pages.
Official Action for U.S. Appl. No. 15/224,660, dated Jan. 26, 2017, 6 pages, Restriction Requirement.
Notice of Allowance for U.S. Appl. No. 15/224,660, dated Apr. 26, 2017, 8 pages.
Official Action for U.S. Appl. No. 15/224,661, dated Jun. 6, 2017, 8 pages, Restriction Requirement.
Official Action for U.S. Appl. No. 15/224,661, dated Sep. 19, 2017, 13 pages.

* cited by examiner

VEHICLE HAVING A BATTERY PACK DIRECTLY ATTACHED TO THE CROSS RAILS OF A FRAME STRUCTURE

PRIORITY CLAIM

This application is a continuation-in-part of U.S. Non-Provisional application Ser. No. 15/224,659, filed Jul. 31, 2016, which is a non-provisional of U.S. Provisional Application No. 62/293,220, filed on Feb. 9, 2016, and U.S. Provisional Application No. 62/300,467, filed on Feb. 26, 2016, and claims priority under 35 U.S.C. § 119 to U.S. Provisional Application No. 62/293,220, filed on Feb. 9, 2016, and U.S. Provisional Application No. 62/300,467, filed on Feb. 26, 2016, all of which are expressly incorporated by reference herein in their entirety.

FIELD OF INVENTION

The present invention relates to a vehicle having a rigid frame structure, and, more particularly, to a vehicle frame structure that includes cross rail members and a battery pack which is directly attached to the cross rail members.

BACKGROUND

Electric vehicles have proven to be a viable alternative to gasoline-powered cars. The increasing demand for electric vehicles has placed importance on the development of the associated technology and the planning of an infrastructure that will support the many electric vehicles that will be on the roads in the future.

Regarding safety, many current electric vehicle designs rely on a rigidity of a battery pack itself to protect the battery cells from damage caused by a collision impact. For example, U.S. Pat. Nos. 8,210,301 and 9,045,030 depict battery packs for electric vehicles that include integrated rigid frame structures that absorb energy during an impact event to protect the battery cells that are also disposed in the battery packs.

This configuration suffers from some drawbacks. In particular, the internal frame structure adds weight to the battery packs, rendering an associated installation process more cumbersome and difficult. Moreover, the design requires the battery pack to be precisely positioned within the vehicle such that impact forces are properly transferred from the vehicle frame to the battery pack. These positioning requirements would further complicate and lengthen an associated installation process.

The present disclosure is directed to overcoming one or more problems of the prior art.

SUMMARY

In one aspect, the present disclosure is directed to a vehicle. The vehicle includes a body forming a passenger compartment. The vehicle also includes a chassis supporting the body. The chassis includes a frame structure having a pair of side rails connected by a plurality of rigid cross rails and defining a plurality of bays between the cross rails. The vehicle additionally includes a battery pack including a plurality of electrical storage devices stored in a battery housing. The battery housing defines a plurality of channels. The vehicle further includes a fastening mechanism attaching the battery housing directly to the plurality of cross rails with at least a portion of the battery housing in the plurality of bays and the plurality of cross rails in the plurality of channels.

In another aspect, the present disclosure is directed to a vehicle. The vehicle includes a body forming a passenger compartment. The vehicle also includes a chassis supporting the body. The chassis including a frame structure comprising a pair of side rails connected by a plurality of rigid cross rails and defining a plurality of bays between the cross rails. The vehicle additionally includes a battery pack including a plurality of electrical storage devices stored in a battery housing. The battery housing defines a plurality of channels. The vehicle further includes a fastening mechanism including a plurality of fasteners attaching the battery housing directly to the plurality of cross rails with at least a portion of the battery housing in the plurality of bays and the plurality of cross rails in the plurality of channels. Each of the cross rails includes a first portion and a second portion which extends perpendicular to the first portion. The first portion of the cross rails contacts a top surface of the battery housing adjacent to a respective channel and the second portion of the cross rails extends into the respective channel.

In yet another aspect, the present disclosure is directed to a method of attaching a battery pack to a vehicle including a frame structure. The frame structure includes a plurality of rigid cross rails defining a plurality of bays. The method includes positioning the battery pack such that at least a portion of a battery housing is in the plurality of bays and the plurality of cross rails are in a corresponding plurality of channels formed in the battery housing. The method also includes attaching the battery housing directly to the plurality of cross rails by inserting a plurality of fasteners through the battery housing and a bottom plate of the cross rails.

BRIEF DESCRIPTION OF THE DRAWING(S)

The foregoing summary and the following detailed description will be better understood when read in conjunction with the appended drawings, which illustrate a preferred embodiment of the invention. In the drawings.

DETAILED DESCRIPTION OF THE PREFERRED EMBODIMENT(S)

Disclosed embodiments provide a structural configuration for an electric vehicle. The structural configuration includes a frame structure for receiving a battery pack. The frame structure is formed into and is integral with a chassis of the vehicle. The frame structure includes a plurality of rigid interconnected components which create a space for receiving one or more of the battery packs. The frame structure forms a rigid skeleton which is configured to protect the battery packs during a collision. This configuration allows the battery pack to be a separate component from the frame structure and alleviates the need for the battery pack to include its own internal frame structure.

Figure 1:
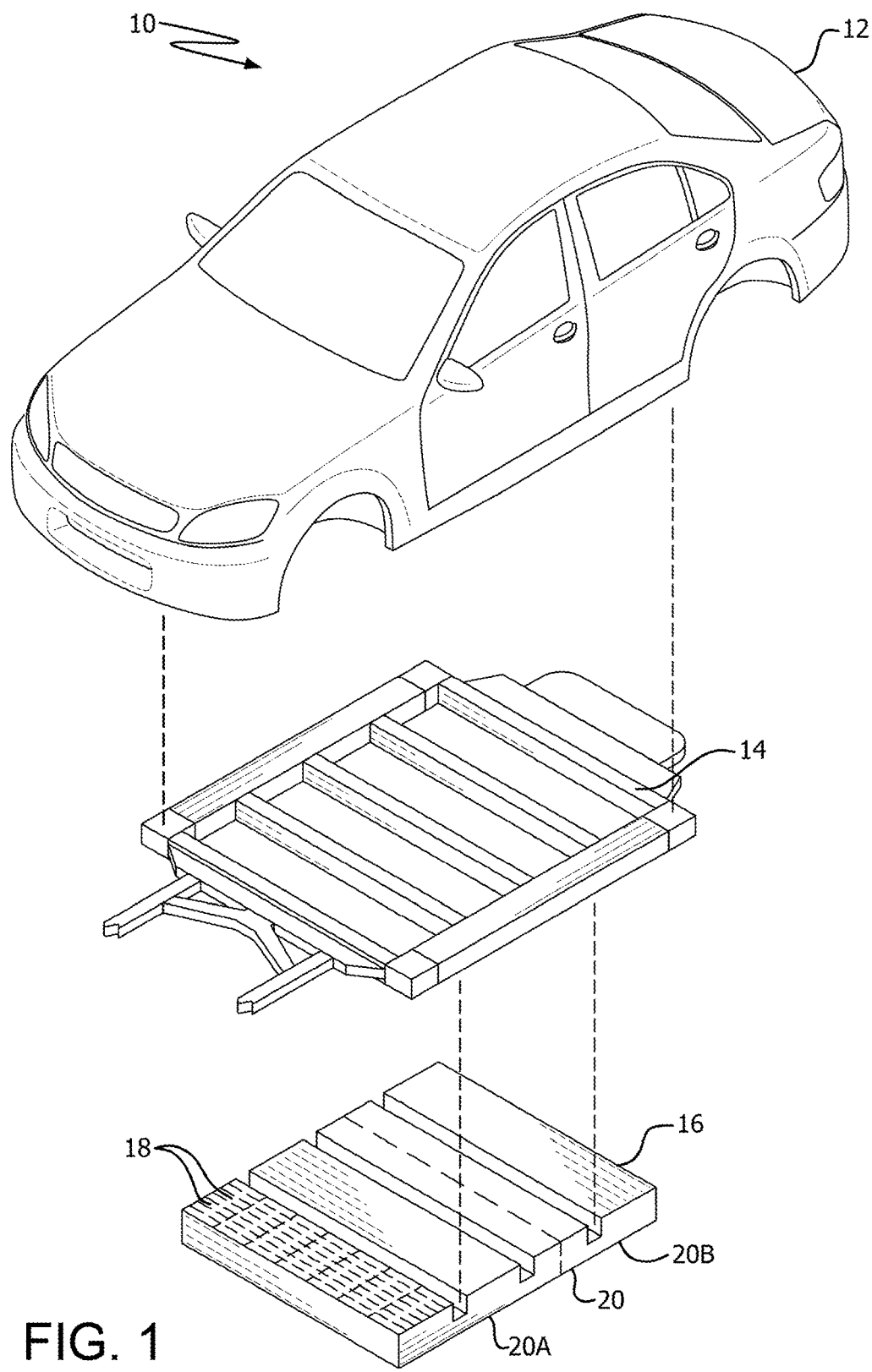
FIG. 1 is an exploded view of an exemplary vehicle.

FIG. 1 is an exploded view illustrating an exemplary vehicle 10. Vehicle 10 includes at least a body 12, a chassis 14, and a battery system 16. The body 12 includes the features and components that form the passenger compartment and exterior shell of the vehicle 10. The body 12 is supported on and by the chassis 14. The chassis 14 is a skeleton frame structure which includes, for example, a plurality of interconnected frame components, such as rigid bars, plates, fasteners, etc. The chassis 14 forms a base for supporting the body 12 and which is supported off of the ground by the wheels of the vehicle 10. The chassis 14 essentially forms a bottom portion of the vehicle 10. The battery system 16 is integrated into the body 12 and chassis 14 and provides electrical energy to a power system of the vehicle 10 through a plurality of electrical storage devices 18 provided in one or more battery packs 20.

Consistent with disclosed embodiments, vehicle 10 is an electric vehicle. This means that the electrical storage devices 18 provide electrical energy to a motor (not shown) for generating mechanical power to move the vehicle 10. For example, in some embodiments, vehicle 10 is an all-electric vehicle in which all or substantially all of the power generated to move vehicle 10 is provided by the electrical storage devices 18. In these embodiments, the vehicle 10 includes an engine only as a backup power source or does not include an engine. In other embodiments, vehicle 10 is a hybrid vehicle in which some of the power generated by the power system 16 is provided by the electrical storage devices 18 and a remainder of the power is provided by an engine, such as an internal combustion engine.

It should be understood that the battery system 16 includes additional components which allow the electrical storage devices 18 to be utilized to provide electrical energy to a motor to power the vehicle 10. For example, the battery system 16 may include electrical connections (e.g., wiring, bus bars, etc.), cooling features (e.g., cooling panels), control system components (e.g., controllers, sensors, actuators, etc.), and the like, in order to allow the vehicle 10 to operate via electrical energy.

Figure 2:
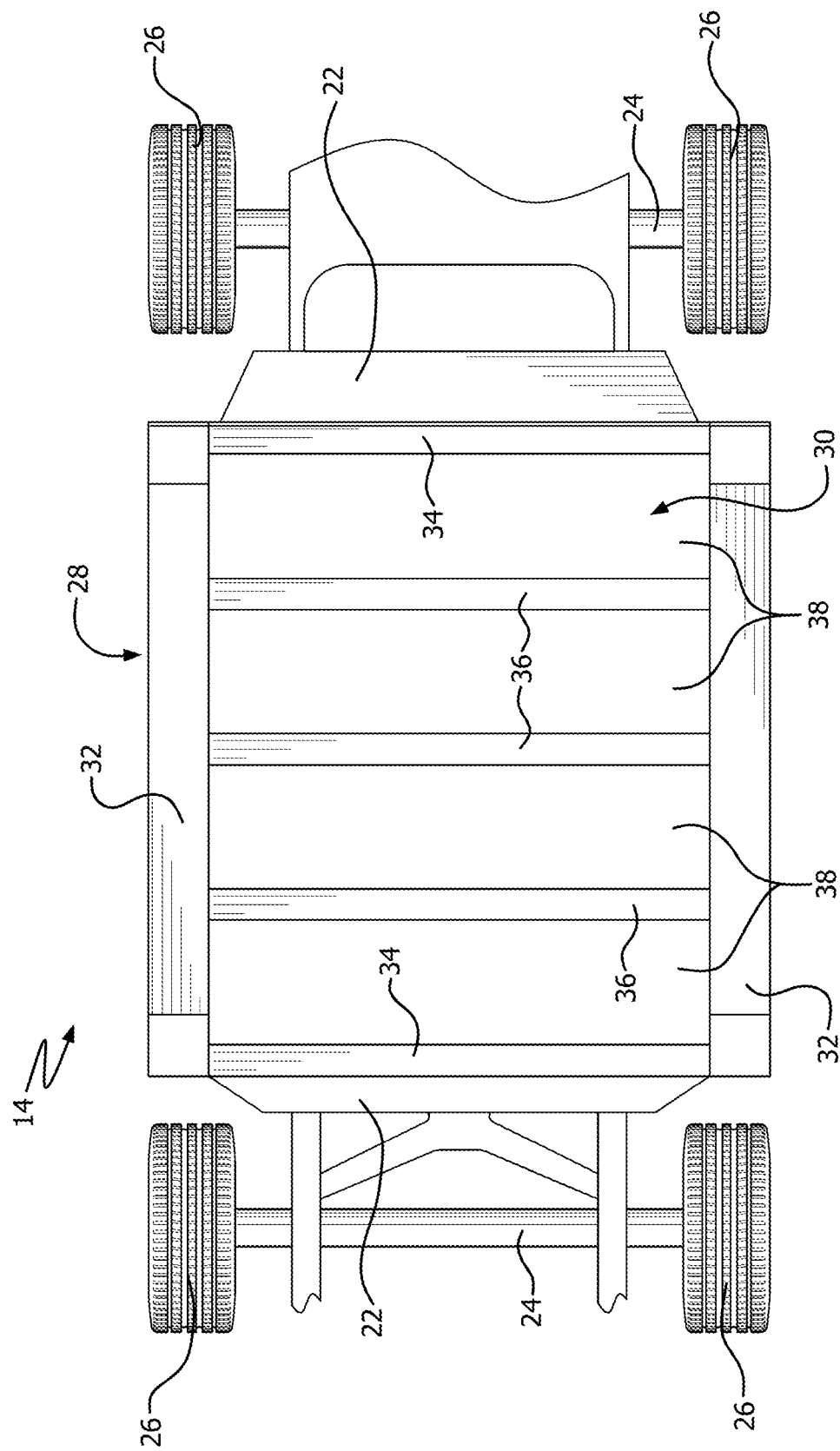
FIG. 2 is a top view of a chassis of the vehicle of FIG. 1, including a frame structure for receiving a replaceable battery pack.

FIG. 2 is a top view of the chassis 14 of the vehicle 10. In an exemplary embodiment, the chassis 14 includes front and rear brackets 22 for securing to front and rear axles 24 of the vehicle 10. The front and rear axles 24 include the vehicle wheels 26 secured at either end for supporting the chassis 14 off of the ground. As shown in FIG. 2, the chassis 14 further includes a frame structure 28 integrally formed therewith. In an exemplary embodiment, the frame structure 28 includes a plurality of interconnected bars which form a space 30 for receiving one or more battery packs 20 of the battery system 16. The frame structure 28, together with the battery pack 20, forms a battery protection system configured to protect the battery packs 20 received in the space 30.

In an exemplary embodiment, the frame structure 28 includes a pair of side rails 32 which run longitudinally on opposing sides of the vehicle 10. The side rails are interconnected at their ends by end rails 34. In an exemplary embodiment, the end rails 34 are respectively secured to the front and rear brackets 22. It should be understood, however, that the end rails 34 may be any connecting member of the chassis 14, and are not necessarily formed at the ends of the chassis 14.

As shown in FIG. 2, the frame structure 28 further includes a plurality of cross rails 36. The cross rails 36 run transverse to the vehicle 10, perpendicular to the side rails 32. The cross rails 36 are preferably formed from a high-strength material, such as steel, aluminum, or composite such that the cross rails 36 are rigid. Respective ends of the cross rails 36 are fastened to the side rails 32 such that a plurality of bays 38 are formed between the side rails 32, separated by the cross rails 36.

Figure 3:
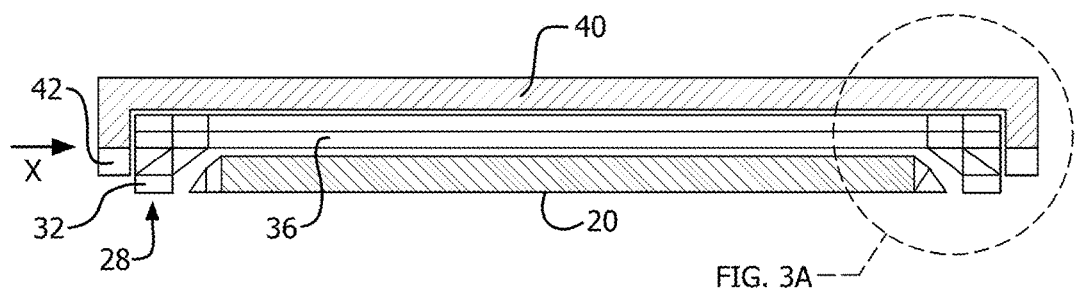
FIG. 3 is a transverse cross-sectional view of a lower portion of the vehicle of FIG. 1.

FIG. 3 is a transverse cross-sectional view of a lower portion of the vehicle 10, including a lower portion of the body 12, the chassis 14, and the battery system 16. The battery system 16 is arranged so that the battery packs 20 are positioned beneath a floor panel 40 of the body 12. In some embodiments, each side rail 32 is attached to a respective side runner panel 42 of the body 12. The battery pack 20 is positioned between the side rails 32 and at least partially beneath the cross rail 36.

Figure 3A:
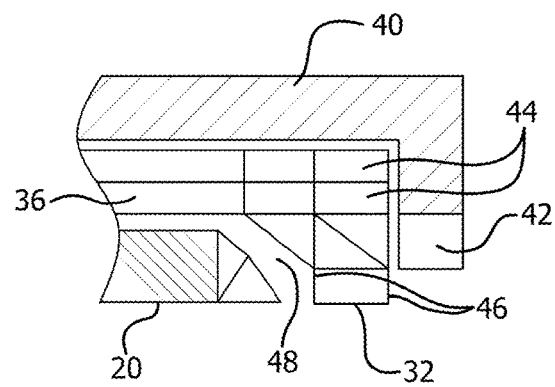
FIG. 3A is an enlarged cross-sectional view of a portion of the vehicle of FIG. 3.

As shown in FIG. 3A, the side rails 32 are formed of a plurality of interconnected panels, including horizontally-extending panels 44 and vertically-extending panels 46. In addition, side rails 32 may further include one or more diagonal bracing members 48 which further reinforce the interconnected panels that form the side rails 32.

The exemplary disclosed side rails 32 include a configuration in which a force near the battery system 16 from an impact received on a side of the vehicle 10 is carried primarily by the rigid cross rails 36. For example, an impact force which acts in a direction 100 on a side rail 32 is transferred to the cross rail 36 which is able to withstand the force without buckling. This is due, at least in part, to the cross rails 36 being interconnected with the same side rails 32, formed from a high strength material, and being integrated into the chassis 14 of the vehicle 10. The replaceable battery packs 20 may be separate components removably positioned within the bays 38 and protected by the rigid frame structure 28 formed by the side rails 32 and the cross rails 36.

Figure 4:
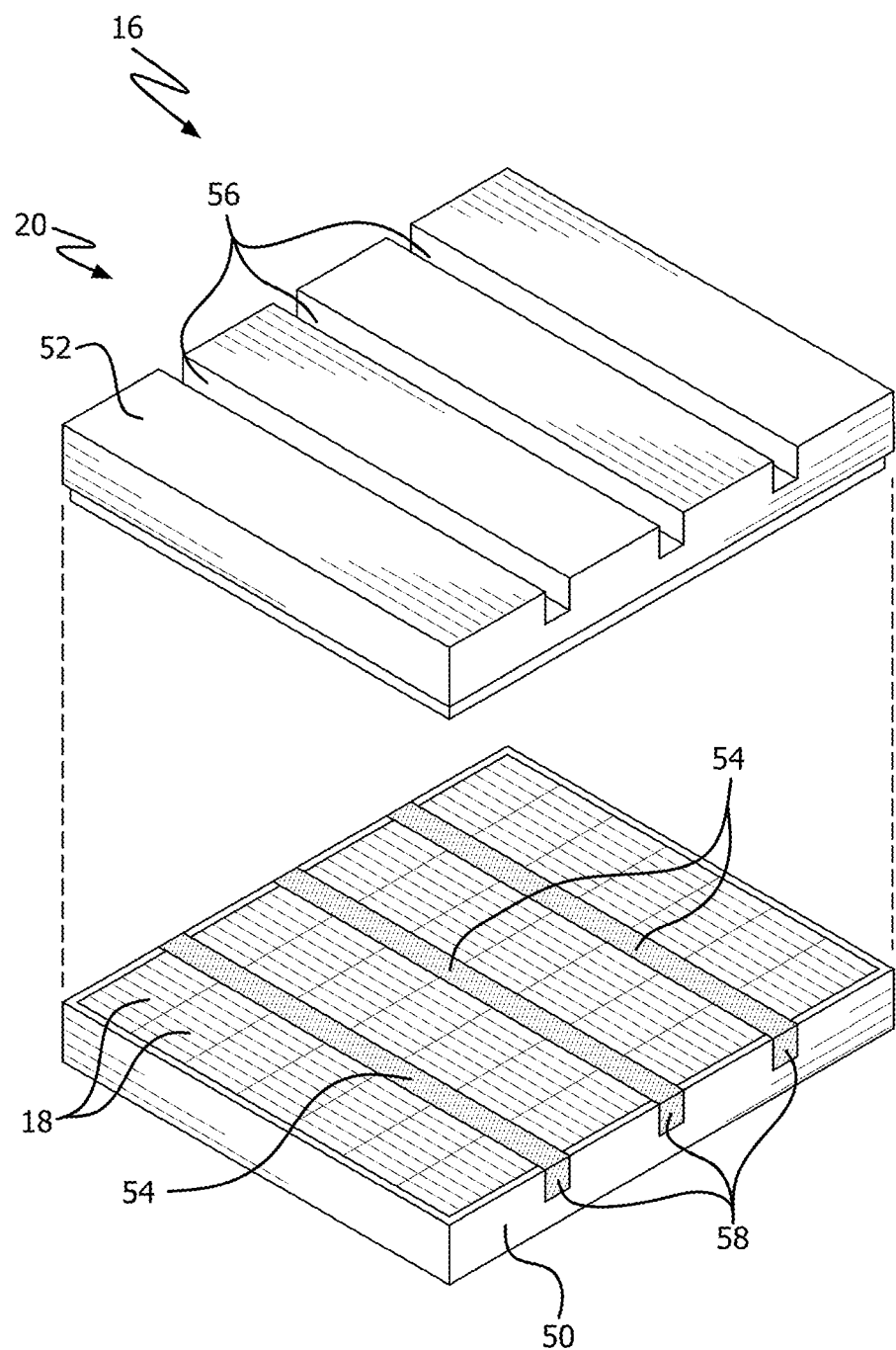
FIG. 4 is an illustration of an exemplary replaceable battery pack.

FIG. 4 illustrates an exploded view of a battery pack 20. The battery pack 20 includes a container 50 and a plurality of electrical storage devices 18 positioned in the container 50. A lid 52 (which may be a separate or integral part of the container 50) covers and encloses the electrical storage devices 18 in the container 50. The size, amount, and positioning of the electrical storage devices 18 in the container 50 is not limited to any particular configuration. In some embodiments, the battery pack 20 may include groups of electrical storage devices 18 having one or more partitions 54 positioned therebetween.

Each battery pack 20 preferably includes at least one channel 56 defined at an upper portion thereof. Each channel 56 extends transversely across the battery pack 20. Each channel 56 is formed at least by the lid 52 of the battery pack. In at least some embodiments, at least one channel 56 is formed in a middle portion of the battery pack 20. In other words, at least one channel is spaced from the longitudinal ends of the battery pack 20. The channel(s) 56 formed in the container 50 are preferably shaped to help guide the battery pack 20 into the space 30, as will be described in greater detail below.

In some embodiments, openings 58 are formed on opposing sides of the container 50. The openings 58 may be aligned with the channel 56 formed in the lid 52 such that the walls forming the channel 56 are received in the openings 58. In an exemplary embodiment, the partitions 54 are aligned with and positioned beneath the openings 58 such that the channel 56 sits above the partition 54. In this way, each partition 54 and channel 56 forms a combined separating partition which separates the groups of electrical storage devices 18.

It should be understood that the configuration of the battery pack depicted in FIG. 4 is exemplary and that other configurations are possible. For example, the channels 56 may be formed in the container 50 and separate lids or coverings may be used to cover the different groups of electrical storage devices 18. Moreover, the lid or lids 52 may be removable from the container 50, permanently attached to the container 50, or integrally formed with the container 50. A battery pack 20 including at least one channel 56 encompasses the many possible configurations, including those in which the channel 56 is formed in the container 50, the lid 52, or both.

Figure 5:
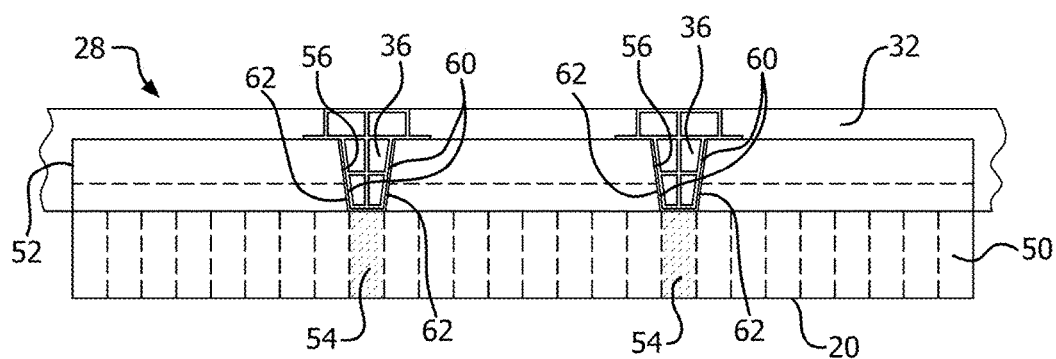
FIG. 5 is a longitudinal cross-sectional view of a lower portion of the vehicle of FIG. 1.
Figure 6:
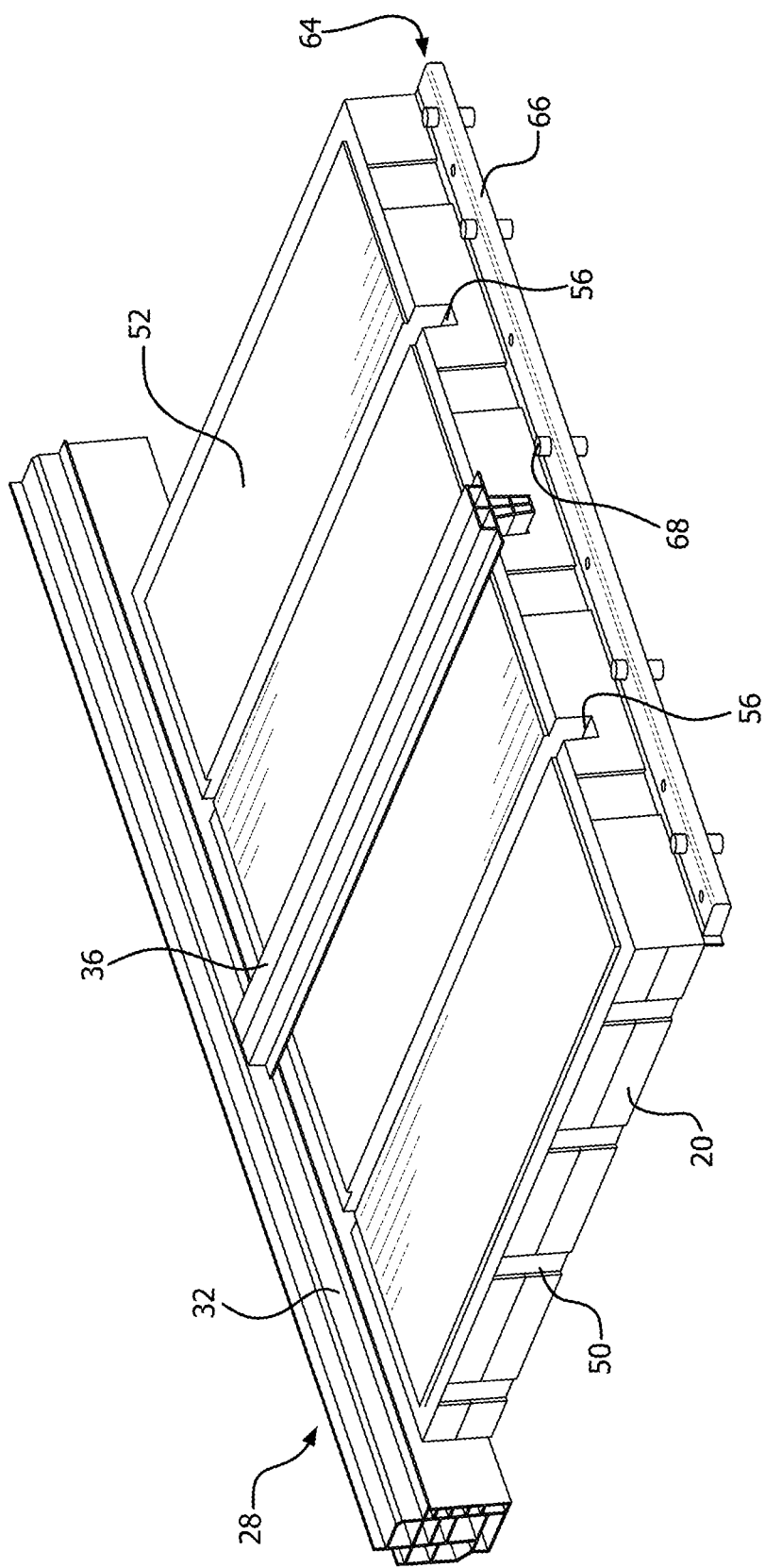
FIG. 6 is a perspective view of a replaceable battery pack secured to a frame structure.

As shown in FIGS. 5-6, the battery pack 20 is configured to be positioned in at least one bay 38 defined by the frame structure 28. Preferably, one battery pack 20 is positioned in a plurality of bays 38 defined by the frame structure 28. In other words, the battery pack 20 is positioned such that it longitudinally traverses a cross rail 36. Each channel 56 formed in the battery pack 20 is configured to receive a cross rail 36. In an exemplary embodiment, the battery pack 20 includes at least three channels 56 and the frame structure 28 includes at least three cross rails 36.

In some embodiments, the battery system 16 may include a plurality of battery packs 20. For example, the battery system 16 may include a first battery pack 20A and a second battery pack 20B (shown as an alternative in FIG. 1). Each battery pack 20 may include one or more channels 56 for receiving a corresponding cross rail 36. In other embodiments, the plurality of battery packs 20 may include cutouts at the longitudinal sides thereof in order to form the channels 56 at the locations where the plurality of battery packs 20 are adjacent to each other (e.g., two battery packs 20 form a single channel 56).

FIG. 5 illustrates a longitudinal cross-sectional view of battery pack 20 and the frame structure 28 of the chassis 14. The channels 56 formed in the container 50 and/or lid 52 are sized and shaped to receive the cross rails 36. In an exemplary embodiment, the cross rails 36 include a trapezoidal or generally triangular cross-section such that the cross rail 36 is tapered. For example, the cross rail 36 includes a pair of converging side walls 60. The channels 56 preferably include a corresponding shape which also includes converging side walls 62, generally parallel to the side walls 60.

The tapered configuration allows the battery pack 20 to easily be positioned with respect to the frame structure 28. For example, the larger upper end of the channel 56 and the smaller lower end of the cross rails 36 create an initially large tolerance for the cross rail 36 to be received in the corresponding channel 56. As the battery pack 20 is raised into the space 30, the converging side walls 62 of the channels 56 are guided by the converging side walls 60 of the cross rails 36.

FIG. 6 illustrates a perspective view of an exemplary battery pack 20 and portions of the frame structure 28. In an exemplary embodiment, the battery pack 20 includes three channels 56 formed in the lid 52. The frame structure 28 includes three corresponding cross rails 36 (only one shown) which are received in the channels 56. In a preferred embodiment, the cross rail 36 is longer than the corresponding channel 56 such that a portion of the cross rail 36 projects laterally out of the channel 56 and to a corresponding side rail 32. In this way, absent major deformation to the cross rail 36, an impact force will not directly impinge on the battery pack 20, thereby protecting the battery pack 20 from damage during a collision.

FIG. 6 illustrates an exemplary fastening mechanism 64 for securing the battery pack 20 to the frame structure 28. In an exemplary embodiment, the fasting mechanism 64 includes a flange 66 extending from a portion of the container 50 (e.g., a bottom portion) and a plurality of fasteners 68 which extend through apertures in the flange 66. The plurality of fasteners 68 are secured to a portion of the frame structure 28, such as a flange or flanges attached to a lower portion of a corresponding side rail 32.

The fastening mechanism 64 is preferably configured to allow for ease of connection of the battery pack 20 to the frame structure 28. In order to achieve this functionality, a variety of different connectors may be used as the fasteners 68. For example, fastener 68 may be a single-sided fastener, a blind bolt, a latching mechanism, etc. In this way, attachment and detachment of the battery pack 20 to the frame structure 28 may be done quickly and easily to facilitate exchanging of battery packs 20 (e.g., swapping a discharged battery pack with a charged battery pack). The fastening mechanism 64 is one embodiment in which the battery pack 20 is attached to the side rails 32.

Figure 7:
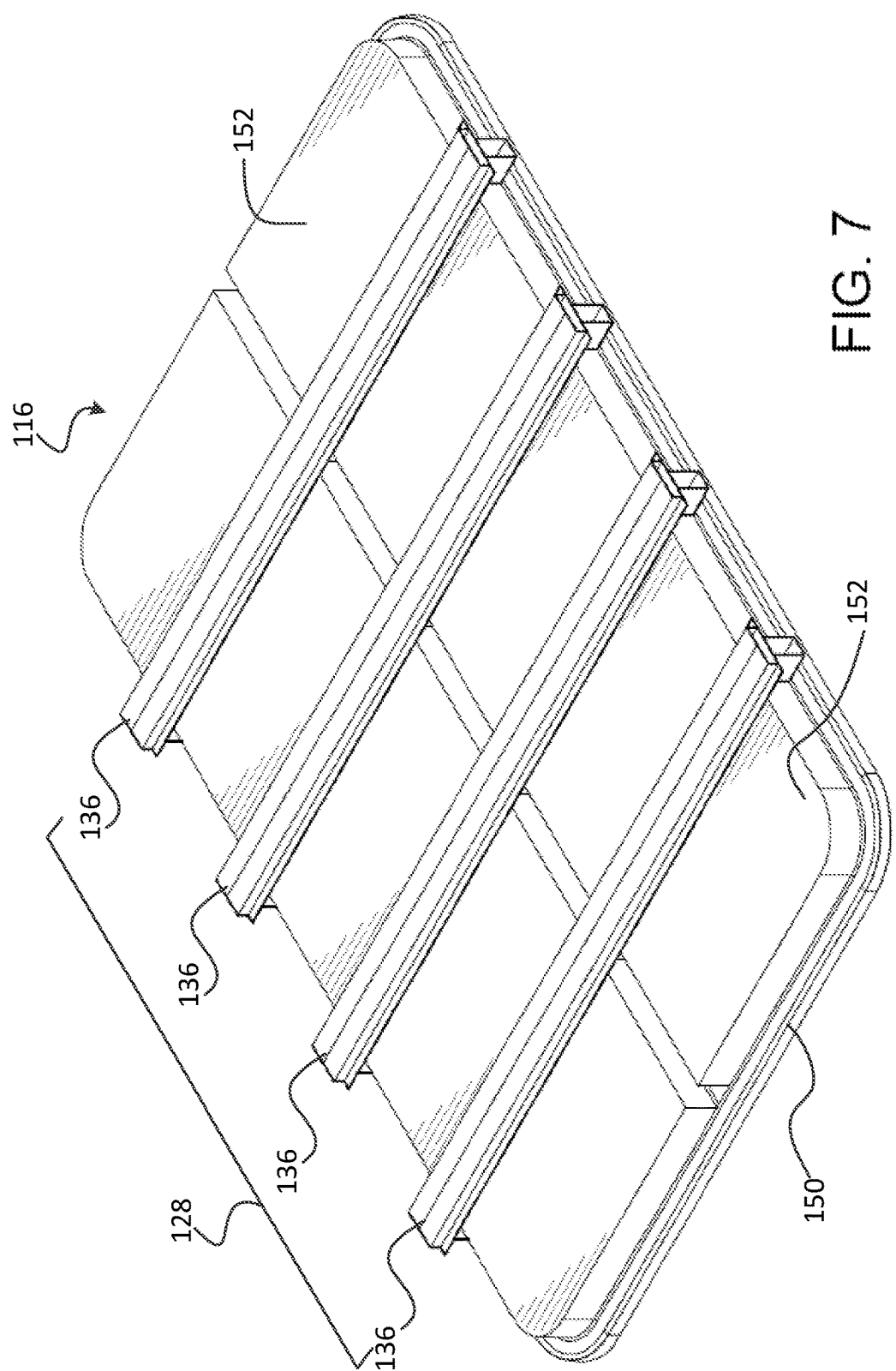
FIG. 7 is a perspective view of a battery pack which is directly secured to cross rails of a frame structure.
Figure 8:
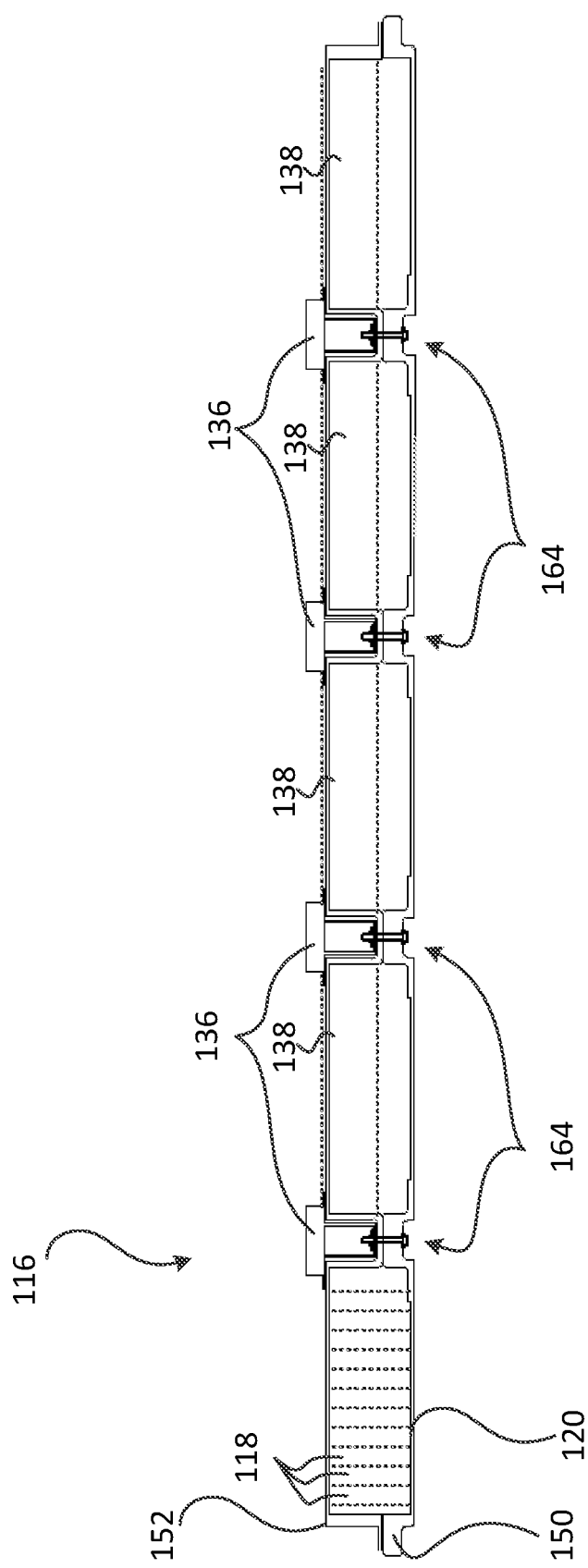
FIG. 8 is a side view of the battery pack and cross rails of FIG. 7.
Figure 9:
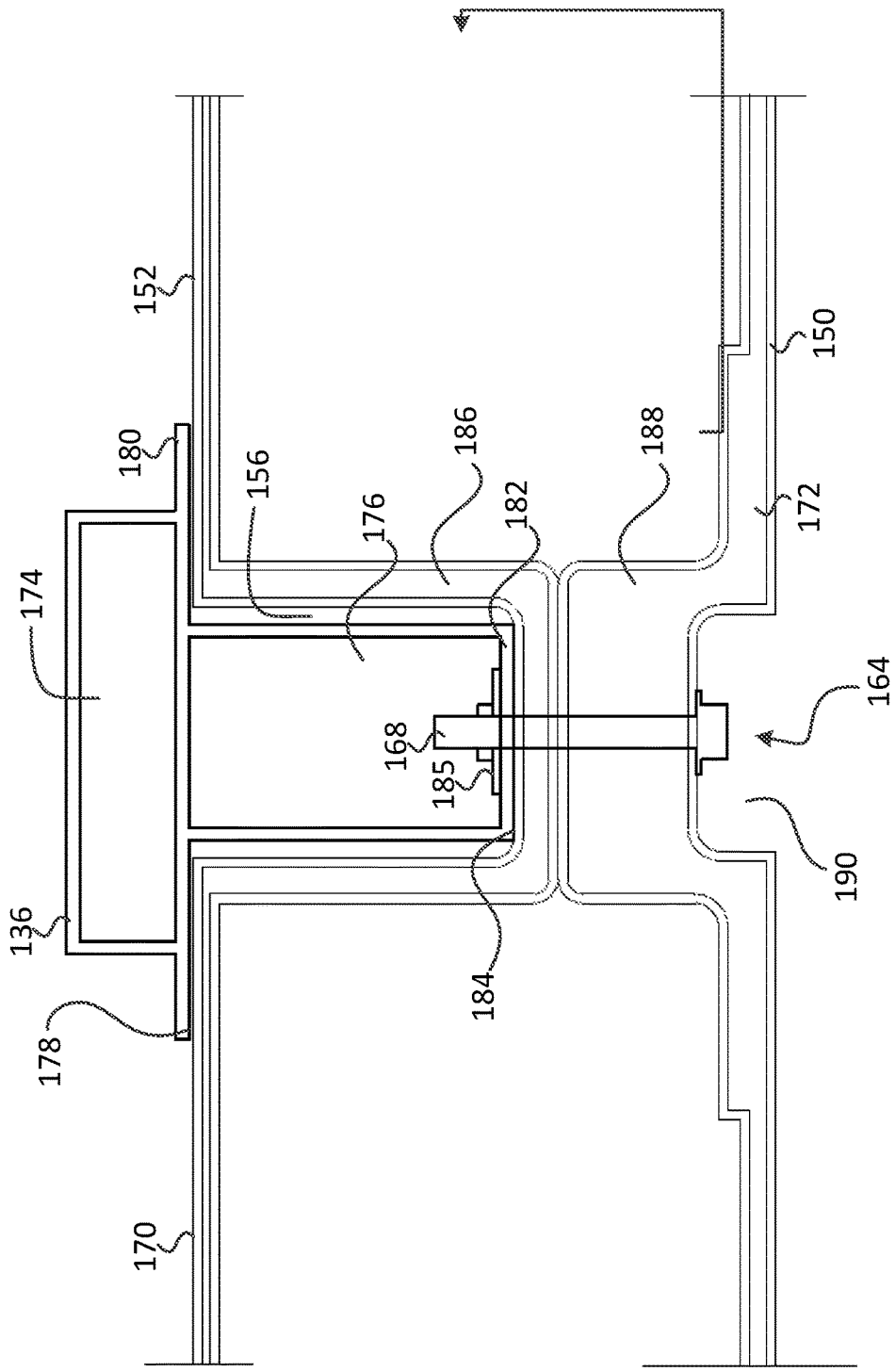
FIG. 9 is an enlarged cross-sectional view of the battery pack and a fastening mechanism for securing the battery pack of FIG. 7 directly to the cross rails.

FIGS. 7-9 illustrate another embodiment of a battery system 116 in which a battery pack 120 is directly attached to a plurality of cross rails 136 of a frame structure 128 by a fastening mechanism 164. The battery pack 120 is similar to the battery pack 20 described above and includes a battery housing 122 which stores a plurality of electrical storage devices 118 (shown in FIG. 8). The frame structure 128 may be connected as part of the vehicle 10 and chassis 14 or a similar vehicle and chassis configuration. For example, the cross rails 136 may be connected between the side rails 32.

The battery housing 122 is directly attached to the cross rails 136 which firmly positions the battery pack 120 in a plurality of bays 138 defined by the cross rails 136 (i.e., at least a portion of the battery housing 122 is positioned in the plurality of bays 138). The direct attachment to the cross rails 136 inhibits relative movement between the cross rails 136 and the battery pack 120, such that the cross rails 136 remain in position to carry an impact load. In other words, an impact force is transferred and carried through the cross rails 136 while inhibiting shifting of the battery pack 120 into a position which may cause the battery pack 120 to be damaged by the impact.

As shown in FIGS. 7-8, the battery housing 122 defines a plurality of channels 156 which receive the plurality of cross rails 136. In an exemplary embodiment, the battery housing 122 includes a lower housing 150 and an upper housing 152. The lower housing 150 includes a bottom wall 170 which forms a support surface for the plurality of electrical storage devices 118. The upper housing 152 includes a top wall 172 which forms a cover for the electrical storage devices 118. The plurality of channels 156 are formed by the upper housing 152.

In an exemplary embodiment, the fastening mechanism 164 includes a plurality of fasteners 168. The plurality of fasteners 168 each extend through a portion of the battery housing 122 and a respective cross rail 136. For example, the plurality of fasteners 168 may include threaded fasteners (e.g., bolts) which extend vertically through at least the bottom wall 170 and into the respective cross rail 136, thereby securing the battery pack 120 to the frame structure 128.

FIG. 9 includes an enlarged cross-sectional view of a portion of the battery pack 120, one of the cross rails 136, and the associated fastening mechanism 164. In an exemplary embodiment, the cross rail 136 includes a first portion 174 and a second portion 176. The first portion 174 preferably extends laterally and the second portion 176 extends perpendicular to the first portion 174. The first portion 174 is wider than the channel 156 and contacts a top surface 178 of the battery housing 122 adjacent to the channel 156. The second portion 176 is slightly narrower than the channel 156 and extends from the first portion 174 into the channel 156.

In an exemplary embodiment, the first portion 174 and the second portion 176 are hollow and formed by interconnected panels. The first portion 174 may include a flange 180 which extends outwardly and contacts the top surface 178 of the battery housing 122. The second portion 176 may be hollow and include a bottom plate 182 which contacts a surface 184 of the battery housing 122 in the channel 156. The fasteners 168 preferably extend through the bottom wall 170, the top wall 172, and the bottom plate 182 of the cross rail 136 such that the battery pack 120 is directly connected to the cross rails 136. The fastening mechanism 164 may include a connection member 185, such as a nut, threaded hole, bolt, etc., which allows the fastener 168 to tighten and pull battery housing 122 toward the cross rail 136 until the first portion 174 is in firm contact with the top surface 178 and the second portion is in firm contact with the surface 184 in the channel 156.

As shown in FIG. 9, the battery housing 122 may be formed such that the bottom wall 170 and the top wall 172 contact each other in the areas where the plurality of fasteners 168 are inserted. This configuration creates a stable connection point which does not leave any gaps for the fasteners 168 to traverse. In some embodiments, the bottom wall 170 and the top wall 172 may include increased-thickness portions 186, 188, respectively, in the areas where the plurality of fasteners 168 are inserted. The increased-thickness portions 186, 188 may have a greater thickness than other portions of the battery housing 122 and may come into contact with each other to form a partition which separates different sections of the batter pack 120. In an exemplary embodiment, the bottom wall 170 has a greater thickness in the increased-thickness portion 186 than the top wall 172 in the increased-thickness section 188.

In some embodiments, the bottom wall 170 further defines a plurality of grooves 190 which are aligned with a respective channel 156. Heads of the fasteners 168 may be positioned in the grooves 190. In this way, the heads of the fasteners 168 are not easily contacted, which helps to reduce the potential for damage to the fasteners 168.

The disclosed battery pack 120 and fastening mechanism 164 is configured for simple and secure attachment to the cross rails 136. A method of attaching the battery pack 120 may include positioning the battery pack 120 such that at least a portion of a battery housing 122 is in the plurality of bays 138 and the plurality of cross rails 136 are in the corresponding plurality of channels 156 formed in the battery housing 122. With this positioning attained, the battery housing 122 may be attached directly to the cross rails 136 by inserting the plurality of fasteners 168 through the battery housing 122 and a bottom plate 182 of the cross rails 136. The first portion 174 is held in firm contact with the top surface 178 (e.g., with flange 180) and the bottom plate 182 is held in firm contact with the surface 184 in the channel 156 through this connection. The combination of the rigid cross rails 136 and the plurality of attachment points created by the fasteners 168 produce a secure connection between the battery pack 120 and frame structure 128.

The frame structure described herein sufficiently protects a battery pack from harmful damage during a collision. For example, the frame structure inhibits impact forces from even reaching the battery pack. The disclosed fastening mechanism in which the battery pack is directly attached to the cross rails provides the additional advantage of maintaining the position of the battery pack relative to the cross rails. Moreover, the disclosed configuration of battery pack, cross rails, and fastening mechanism provide features which create a stable connection which is strong and reliable. This configuration also lends itself to processes for replacing the battery pack when necessary.

Having thus described the presently preferred embodiments in detail, it is to be appreciated and will be apparent to those skilled in the art that many physical changes, only a few of which are exemplified in the detailed description of the invention, could be made without altering the inventive concepts and principles embodied therein. It is also to be appreciated that numerous embodiments incorporating only part of the preferred embodiment are possible which do not alter, with respect to those parts, the inventive concepts and principles embodied therein. The present embodiments and optional configurations are therefore to be considered in all respects as exemplary and/or illustrative and not restrictive, the scope of the invention being indicated by the appended claims rather than by the foregoing description, and all alternate embodiments and changes to this embodiment which come within the meaning and range of equivalency of said claims are therefore to be embraced therein.

What is claimed is:

1. A vehicle comprising:
   a body forming a passenger compartment;
   a chassis supporting the body, the chassis including a frame structure comprising a pair of side rails connected by a plurality of rigid cross rails and defining a plurality of bays between the cross rails;
   a battery pack including a plurality of electrical storage devices stored in a battery housing, the battery housing defining a plurality of channels; and
   a fastening mechanism attaching the battery housing directly to the plurality of cross rails with at least a portion of the battery housing in the plurality of bays and the plurality of cross rails in the plurality of channels,
   wherein the battery housing comprises:
      a lower housing which includes a bottom wall which forms a support surface for the plurality of electrical storage devices; and
      an upper housing which includes a top wall which forms a cover for the plurality of electrical storage devices,
   wherein the plurality of channels are formed by the upper housing,
   wherein the fastening mechanism includes a plurality of fasteners each inserted through the bottom wall, the top wall, and a bottom plate of a respective cross rail, and
   wherein the bottom wall contacts the top wall in the areas where the plurality of fasteners are inserted.

2. The vehicle of claim 1, wherein the bottom wall and the top wall include increased-thickness portions in the areas where the plurality of fasteners are inserted.

3. The vehicle of claim 1, wherein the bottom wall is thicker than the top wall in the increased-thickness portions.

4. The vehicle of claim 1, wherein the bottom wall defines a plurality of grooves which are aligned with a respective channel of the plurality of channels, and wherein heads of the plurality of fasteners are positioned in a respective groove.

5. The vehicle of claim 1, wherein each of the plurality of cross rails comprises:
a first portion which is wider than a respective channel and contacts a top surface of the battery housing adjacent to a respective channel; and
a second portion which extends perpendicular to the first portion into the channel and contacts a surface of the battery housing in the channel, the second portion including the bottom plate.

6. The vehicle of claim 5, wherein the first portion is hollow and includes a flange which extends outwardly and contacts the top surface of the battery housing, and
wherein the second portion is hollow and includes a bottom plate which contacts a surface of the battery housing in the channel.

7. The vehicle of claim 5, wherein the second portion is hollow.

8. A vehicle comprising:
a body forming a passenger compartment;
a chassis supporting the body, the chassis including a frame structure comprising a pair of side rails connected by a plurality of rigid cross rails and defining a plurality of bays between the cross rails,
a battery pack including a plurality of electrical storage devices stored in a battery housing, the battery housing defining a plurality of channels; and
a fastening mechanism including a plurality of fasteners attaching the battery housing directly to the plurality of cross rails with at least a portion of the battery housing in the plurality of bays and the plurality of cross rails in the plurality of channels,
wherein each of the cross rails includes a first portion and a second portion which extends perpendicular to the first portion,
wherein the first portion of the cross rails contacts a top surface of the battery housing adjacent to a respective channel and the second portion of the cross rails extends into the respective channel, and
wherein the first portion of the cross rails is hollow and includes a flange which extends outwardly and contacts the top surface of the battery housing.

9. The vehicle of claim 8, wherein the battery housing comprises:
a lower housing which includes a bottom wall which forms a support surface for the plurality of electrical storage devices; and
an upper housing which includes a top wall which forms a cover for the plurality of electrical storage devices.

10. The vehicle of claim 9, wherein the plurality of channels are formed by the upper housing.

11. The vehicle of claim 9, wherein the bottom wall and the top wall include increased-thickness portions in areas where the plurality of fasteners are inserted through the battery housing.

12. The vehicle of claim 11, wherein the bottom wall is thicker than the top wall in the increased-thickness portions.

13. The vehicle of claim 8, wherein the second portion of the cross rails is hollow and includes a bottom plate which contacts a surface of the battery housing in the channel.

14. The vehicle of claim 13, wherein the plurality of fasteners extend through the battery housing and the bottom plate into the hollow second portion.

15. The vehicle of claim 14, wherein a bottom wall of the battery housing defines a plurality of grooves which are aligned with the plurality of channels, and wherein heads of the plurality of fasteners are positioned in a respective groove.

16. The vehicle of claim 8, wherein the battery housing comprises:
a lower housing which includes a bottom wall which forms a support surface for the plurality of electrical storage devices; and
an upper housing which includes a top wall which forms a cover for the plurality of electrical storage devices, wherein the plurality of channels are formed by the upper housing.

17. The vehicle of claim 16, wherein each of the plurality of fasteners is inserted through the bottom wall, the top wall, and a bottom plate of a respective cross rail.

18. The vehicle of claim 17, wherein the bottom wall contacts the top wall in the areas where the plurality of fasteners are inserted.

19. The vehicle of claim 16, wherein the second portion of the cross rails is hollow and includes a bottom plate which contacts a surface of the battery housing in the channel.

20. A method of attaching a battery pack to a vehicle including a frame structure, the frame structure including a plurality of rigid cross rails defining a plurality of bays, the method comprising:
positioning the battery pack such that at least a portion of a battery housing is in the plurality of bays and the plurality of cross rails are in a corresponding plurality of channels formed in the battery housing; and
attaching the battery housing directly to the plurality of cross rails by inserting a plurality of fasteners through the battery housing and a bottom plate of the cross rails,
wherein each of the plurality of cross rails comprises:
a first portion which is wider than a respective channel and contacts a top surface of the battery housing adjacent to a respective channel; and
a second portion which extends perpendicular to the first portion into the channel and contacts a surface of the battery housing in the channel, the second portion including the bottom plate,
wherein the first portion is hollow and includes a flange which extends outwardly and contacts the top surface of the battery housing.

* * * * *